United States Patent [19]

Robson

[11] 4,454,616
[45] Jun. 19, 1984

[54] APPARATUS FOR COLLECTING PROPOLIS FROM A BEE COLONY

[76] Inventor: Charles H. Robson, 6241 S. 30th St., Phoenix, Ariz. 85040

[21] Appl. No.: 383,065

[22] Filed: May 28, 1982

[51] Int. Cl.³ .............................................. A01K 47/06
[52] U.S. Cl. .......................................... 6/4 R; 6/12 R
[58] Field of Search ............................... 6/1, 4 R, 12 R

[56] References Cited

U.S. PATENT DOCUMENTS

| 1,252,437 | 1/1918 | Hodgson | 6/4 B |
| 1,468,995 | 9/1923 | Cottam | 6/4 R |
| 2,566,829 | 9/1951 | France | 6/12 R |
| 3,343,186 | 9/1967 | Dunand | 6/1 |
| 4,007,504 | 2/1977 | West | 6/4 R |
| 4,351,074 | 9/1982 | Robson | 6/4 R X |

FOREIGN PATENT DOCUMENTS

| 1223455 | 6/1960 | France | 6/12 M |
| 2055542 | 3/1981 | United Kingdom | 6/4 R |

Primary Examiner—Robert P. Swiatek
Attorney, Agent, or Firm—Cates & Roediger

[57] ABSTRACT

To promote the collection and harvesting of propolis from a bee colony a fine mesh screen through which bees are unable to pass is located in a central ventilation passage of the colony by registering it with the scraper screen of an internal pollen trap. The bees deposit propolis on the screen which can be removed without dismantling the hive.

8 Claims, 6 Drawing Figures

APPARATUS FOR COLLECTING PROPOLIS FROM A BEE COLONY

BACKGROUND OF THE INVENTION

This invention relates to apparatus utilized for harvesting propolis in a honeybee colony.

Beekeepers recognize that bees depend on honey for their carbohydrate food component and pollen for their protein requirements. Typically, these items are collected and stored by the bees to be later made available to the colony during periods of short supply. In addition, bees are known to collect a brownish, waxy substance called propolis from the buds of certain trees. This material is utilized by the bees to cement or caulk their hives primarily during their dormant season. By so doing, the bees winterize the hive structure and substantially reduce the chilling effect of the wind on the colony.

Recently, the proteinaceous character of pollen and propolis has been recognized as making these substances highly beneficial to the human diet. This recognition has generated increasing interest in ways to efficiently and effectively collect and harvest the substances on a commercial basis. The major activity has been heretofore directed to pollen gathering and a variety of different pollen traps have been described in the literature and tested in the bee colonies. However, propolis collection continues to rely on the scraping by hand of deposits in the cracks and openings of the individual hive structures. Since propolis deposition is uncontrolled and often occurs in remote portions of the hive, the gathering frequently results in the presence of contaminants such as paint, wood or other impurities. In addition, the yield per hive is low and the quality non-uniform. The amount of propolis available from a bee colony is related to the hive structure utilized in the primary honey and pollen gathering operations. Since these traditional operations are the major contributors to the beekeeper's income, the harvesting structure for propolis must be made compatible with existing hive structures.

A pollen trap is a device placed in the travel path of honey bees returning to their colony after foraging during the active season. The bees carry pollen in pouches on their legs. To effect removal of pollen from the bees, one or more mesh screens are placed in their travel path within the hive structure. As the bees crawl through the screen the pollen is dislodged from their legs and is collected in a container made inaccessible to the bees by a fine mesh covering.

The collection of pollen on a large scale commercial basis requires that effective pollen trapping be accomplished by a structure that is compatible with commercial equipment presently utilized and be multi-functional so that it does not require dismantling of the colony during normal operation. Thus, it is highly desirable that a trap be capable of being utilized at the bottom, top or in a mid-range position in a bee colony and to have trapping and non-trapping capabilities in each position. Further, the use of a pollen trap should minimize any disturbance of the honey bee colony or the normal flight path of the bee. In addition, it is recommended that the trap employed interfere as little as practical with the required ventilation pattern within the bee colony and particularly within the region surrounding the container of trapped pollen.

Pollen traps which can be included within the hive structure and thus protected from the adverse climatic conditions and various chemical substances in the area are preferred for commercial use. As a result, a number of bottom traps have been described in the literature. The typical manner of providing for the bottom trapping of pollen is to incorporate a pollen scraping screen at or proximate to the bee entrance of the colony with a trapping container incorporated in the base of the colony. In structures wherein the trapping container is positioned just below the bee entryway the pollen is likely to be rendered unsuitable for sale as a result of either exposure to the environment or lack of adequate ventilation. In many bottom traps, the pollen is subject to contamination by external sources or by trash generated within the colony by the bees. Also, small animals and insects are often able to invade the trapping container of modified base structure colonies. As a result, the industry is adapting trapping structures wherein trapping takes place in an internal bee passageway which communicates between the hive body and the external environment.

This invention is concerned with the provision of a propolis gathering device for use with pollen traps that can be incorporated in a bee colony at top, intermediate or bottom trapping positions. In practice, the structure should conform to the dimensions of the conventional colony so it can be positioned on and employed with the colony base to elevate the trapping container from ground level when used as a bottom trap. The structure permits the beekeeper to engage in either trapping of pollen or non-trapping with or without the collection of propolis without requiring removal of the structure from the colony. One such pollen trap is sold by Robson Honey & Supply Co., Phoenix, Ariz. and is marketed as the "ROB-BEE" trap and readily incorporates the subject matter of the present invention.

SUMMARY OF THE INVENTION

The present invention is directed to apparatus for causing propolis to be deposited by bees on a control surface at a central location in a pollen trap of the type dimensioned to fit within a conventional segmented bee colony. This permits the beekeeper to engage in the trapping and non-trapping of pollen and the collection of propolis at different levels within the colony according to his preferred manner of operation and the particular season of use.

The pollen trap includes a housing member which is dimensioned to fit in the stack of hives which form a segmented bee colony. The housing includes a drawer slidably mounted in the front wall thereof. A pollen trap container is preferably centrally mounted within the drawer so as to be spaced from the front, sides and back members of the housing when the drawer is inserted therein.

The pollen trap container has a foraminous upper surface containing a large number of small openings through which pollen can pass. The openings in this surface are smaller than the size of the bee so that access to the interior of the container is denied to the bees. A scraper means, including a centrally located opening with a mesh screen mounted therein is provided within the housing in spaced overlying relationship to the upper surface of the pollen trap. The scraper means may be moved between first and second positions in the housing and can be withdrawn and turned over for reinsertion into the housing. The mesh screening utilized to dislodge pollen from the bees defines an internal bee passageway and is preferably smaller in area than the upper surface of the underlying container.

The centrally located opening in the scraper means provides a bee passageway and ventilating channel communicating between the hive body and the external environment. The use of access control or blocking members in the front wall of the housing and at the internal end of the scraper can be utilized to alter the travel path of the bees if desired. This permits the scraper to be used in trapping or non-trapping modes.

Thus, the pollen trap is capable of performing trapping and non-trapping operations when positioned by the beekeeper at different levels in the colony. The pollen is collected in a central location within the colony and spoilage or contamination due to outside conditions is essentially eliminated. Also, the mounting of the pollen trap in the drawer and its location with respect to the scraper screens has been found to provide the necessary ventilation to retard mold, mildew and other forms of spoilage.

The present invention utilizes the ventilation characteristics of the pollen trap along with the ability to control the air flow pattern by the use of blocking members positioned adjacent the scraper means. The apparatus for localizing the deposition of propolis includes a frame encompassing an area as large as the pollen dislodging screen of the scraper means and a mesh thereon containing air passages small enough to prevent the passage of bees there through.

The frame and mesh structure is removable from the trapping apparatus by withdrawing the scraper means from the housing to permit lifting the propolis gathering structure therefrom. Thus, the height of the propolis gathering frame is made less than the vertical height of the front wall spacing adjacent the top surface of the scraper means.

The placement of the propolis trapping structure on the scraper means, inserting it and blocking the entryway directly below the scraper means results in the passage of air through the small holes in the propolis gathering structure. The bees have been found to treat the presence of the fine mesh as they would a crack or airway in the housing itself and consequently attempt to seal the air passages in the fine mesh with propolis during their dormant season.

The withdrawal of the scraper means from the housing and the removal of the propolis gathering structure therefrom enables the operator to immerse the gathering structure in a heated medium to remove the propolis without contamination thereof.

Further features and advantages of the invention will become more readily apparent from the following detailed description of a preferred embodiment when taken in conjunction with the accompanying drawings.

DESCRIPTION OF THE PREFERRED EMBODIMENT

Figure 1:
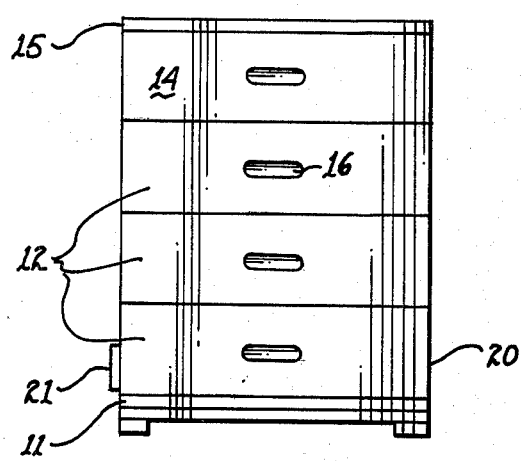
FIG. 1 is a side view of a segmented bee colony containing a pollen trap in the bottom trap position.

Referring now to FIG. 1, a segmented bee colony is shown including a supporting base 11 with a number of hive and honey collecting supers or segments 12 thereon and capped with lid 15. The pollen trap 14 is positioned at the bottom of the segmented bee colony on base 11. The individual segments are provided with recessed gripping areas 16 to facilitate stacking and disassembly prior to moving the colony. FIG. 1 shows the described embodiment in a trapping position at the bottom of the colony. The housing 20 is dimensioned to fit within the colony and is shown containing drawer 21.

The use of the segmented bee colony with the stacked supers and hives is common practice in the industry. The individual hives and supers are open at top and bottom and are adapted for use with elevating base members which provide a bottom or near ground-level bee entry to the colony and top lid members which normally do not permit access to the colony from the outside.

Figure 3:
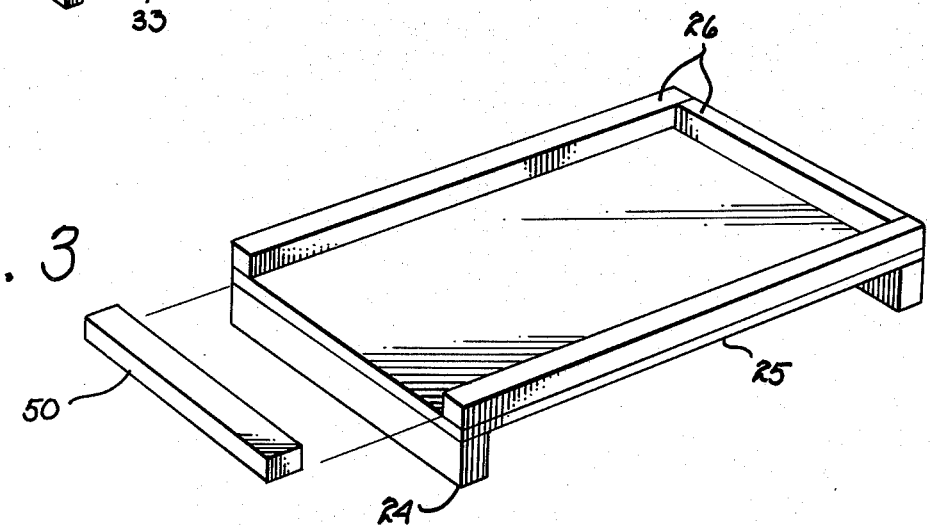
FIG. 3 is a perspective view of the colony supporting base.

Since all segments of a colony communicate internally, the single bottom or base entryway is the typical manner of providing access to the colony during normal operation. In different regions of the country, it is common to affix the base to the bottom super in the colony. The elevating base structure is shown in FIG. 3 including supporting legs 24, which rest on the ground and elevate the base board 25 from ground level. The three edge supports 26 are mounted on the base board so as to provide the bee entry opening at one end thereof.

Figure 2:
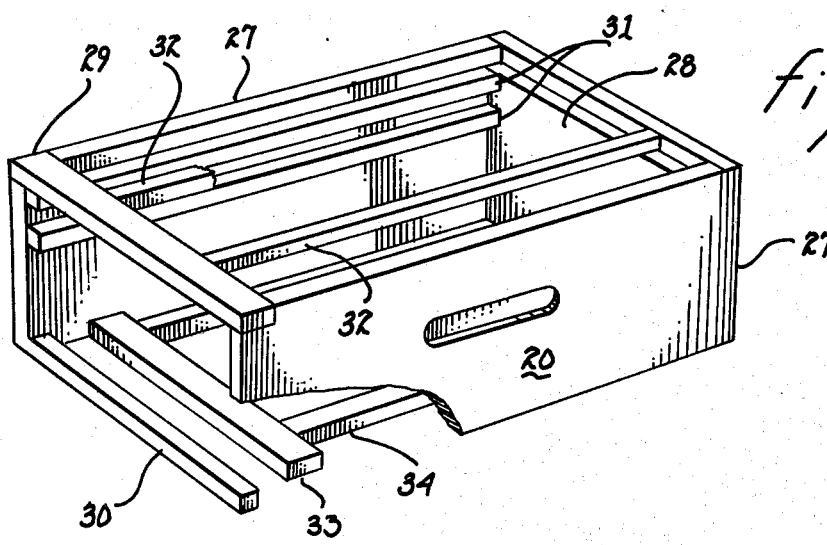
FIG. 2 is a perspective view in partial section of the housing member of a preferred embodiment of pollen trap included in the colony of FIG. 1.

The housing of FIG. 2 is placed directly upon the elevating base structure for use as a bottom position pollen trap. The housing formed with opposing side walls 27, back wall 28 and front wall supports 29 and 30 is open on the top and bottom for communication with other segments of the bee colony. The front wall supports are spaced to permit the insertion of a drawer and an overlying scraper tray within the housing.

The housing 20 contains guideways 31 on each sidewall 27 to slidably receive the scraper tray. The top struts 32 are provided to impart additional rigidity to the housing structure. In the bottom portion of the housing and spaced rearwardly of the front wall are cross support 33 and lengthwide supports 34 extending to the back wall. These supports impart rigidity to the housing and receive the drawer on their upper surface when it is inserted into the housing.

Figure 4:
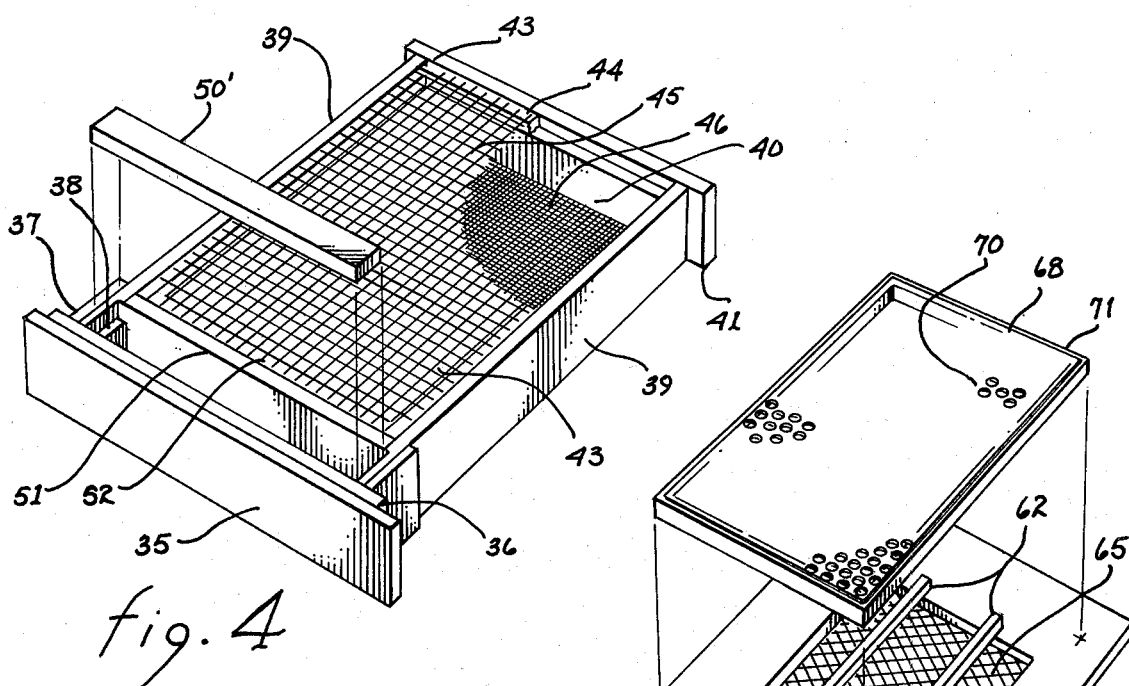
FIG. 4 is a perspective view of the drawer and pollen container for the housing member of FIG. 2.

The drawer containing the pollen trap is shown in FIG. 4 and includes a front wall formed of the exterior cover 35 and the internal sealing member 36 adjacent thereto. The cover 35 extends across the front wall of the housing when the drawer is in place while sealing member 36 extends between the internal surfaces of the sidewalls 27 of the housing. Opposing side walls 39 are fastened to sealing member 36 and each is provided with a brace 37 at the juncture therebetween. Each side wall 39 contains a notch 38 or portion of reduced height adjacent sealing member 36 which is adapted to receive a wooden cleat 50. Wall 51 is positioned between sidewalls 39 and is spaced from sealing member 36 to form a passageway therebetween which can be closed by placing the cleat into notches 38.

At the rear of the drawer, cross member 41 is fastened to the ends of side walls 39. Cross piece 40 of reduced height is affixed to the cross member 41. Rear member 44 along with side members 43 and front member 52, form the rectangular support for the foraminous upper surface 45 of the pollen trap. The trapped pollen passes through this surface when it is dislodged from the bees as will later be described.

The rectangular support for the upper surface is held in position by cross piece 40 of reduced height and similar pieces affixed to sidewalls 39 and front wall 51. Mesh screen 46 is utilized as the floor of the pollen trap to provide good ventilation.

The length of the drawer structure containing the pollen trap is less than the depth of housing 20 or the length of its sidewalls 27 in order to provide a passageway for bees therebehind. Thus, passageways are provided both in front of and in back of the pollen trap. In addition, the spacing between side walls 39 of the drawer may be made less than the spacing between opposing guideways 31 mounted on the side walls 27 of the housing. As a result, side bee passageways are then provided around the entire peripheral region of the pollen trap. When the drawer is inserted into the housing it slides on supports 33 and 34 and sealing member 36 extends to the adjacent edges of the lower guideways.

Figure 5:
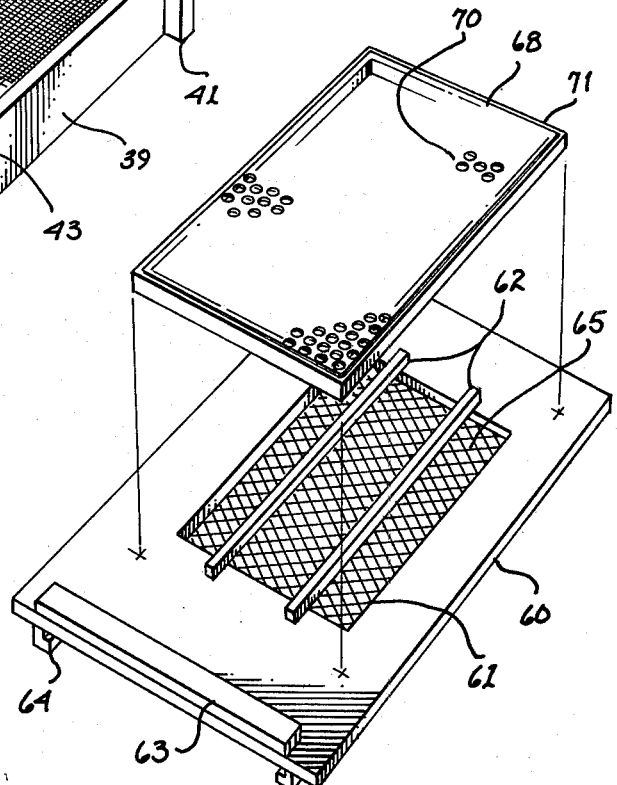
FIG. 5 is a perspective view of one side of the scraper means of the housing member of FIG. 2 including one embodiment of the propolis collector therefor.
Figure 6:
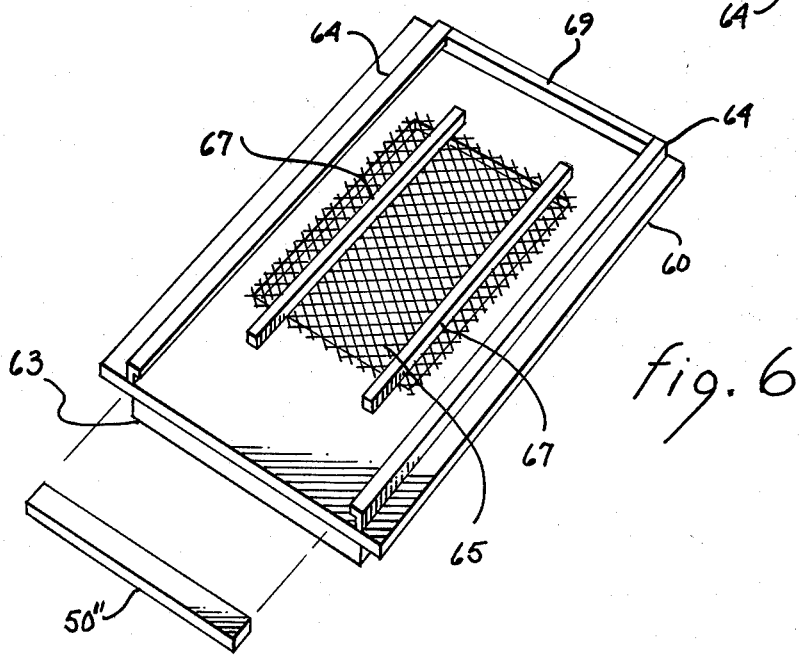
FIG. 6 is a perspective view of the opposing side of the scraper means of FIG. 5.

Access by the bees to the aforementioned passageways surrounding the centrally located pollen trap can be regulated by the use of the overlying scraper means with the exception of the front which is controlled by the use of removable cleat 50. The scraper means shown in FIGS. 5 and 6 is slidably mounted between the guideways 31 of housing 20 and is dimensioned to extend between the rear wall 28 of the housing and the outer surface of the front wall thereof. The scraper means is capable of being withdrawn partially or fully and then rotated 180 degrees and reinserted for different operations at different locations in the colony.

As seen in FIG. 5, the scraper means includes a base member 60 which is dimensioned to fit between the guideways 31 of housing 20 and extend between the guideways and the front and rear wall of the housing. The base member 60 is provided with a central opening 61 which defines the central bee passageway to the overlying supers. The opening is covered with a wire mesh screen 65. Two spaced longitudinal supports 62 extend across opening 61. A blocking member 63, preferably affixed, having a height approximately equal to the upper guideway 31 on housing 20 is mounted on base member 60 at the front edge thereof.

The propolis collector 68 is shown above the scraper means for placement thereon over supports 62 which insure registration with the central opening. The collector 68 includes a rectangular frame 71 at least as large as the central opening and a screen 70 having a multiplicity of small openings therein. The openings are small enough to prevent the passage of bees therethrough but a sufficient number of openings are provided to permit adequate ventilation to the supers.

The placement of the propolis collector on the scraper means over the central opening and the insertion of the scraper means into the housing during the dormant season when the bees are in the hive is found to result in the bees depositing propolis on these small openings in order to reduce the passage of air into the hive. Since the holes are small, the bees cannot use the central opening for ingress and egress and continue depositing propolis during the dormant or non-pollen trapping season. By partially withdrawing the scraper means, the rear passageway behind the pollen trap can be utilized by the bees for hive access, if desired.

In order to harvest the propolis, the scraper means is withdrawn and the collector 68 is removed and placed in hot water. The propolis flows off the screen and is readily gathered for further processing. Contaminant levels are reduced to a minimum and are essentially limited to those introduced by the bees themselves. No mechanical removal steps are required and by utilizing stainless steel screening, the screen has a long life without introducing rust or other contaminating substances to the harvested product.

In FIG. 6, the scraper means is shown in a rotated position with the wire mesh scraper screen 65 retained in position by longitudinal supports 67 having a length equal to that of supports 62 on the opposing side. A beveled rear sealing strip 69 is shown extending between edge members 64 at the rear edge of base member 60. The transverse spacing of the edge members 64 is made approximately equal to the spacing between the notched portions 38 of the housing side walls. The height of these edge members is made approximately equal that of the lower portion of guideway 31 on the side wall of the housing. The insertion of the scraper means in housing 20 in the position shown in FIG. 5 results in blocking member 63 occupying the space between the adjacent guideways 31, front wall support 29 and the base member 60. It should be noted that a portion is removed from one edge of blocking member 63 to provide a gap which permits the ingress and egress of the larger size drone bees to the colony without their having to encounter the scraper means.

When the scraper means is fully inserted in the housing in overlying relationship to the pollen trap drawer as shown in FIG. 5, the edge members 64 extend downwardly to be next to the top surfaces of the side walls 39 and thereby prevent the passage of bees therebetween. If the trap is utilized on the base structure of FIG. 3 in the bottom trap position with the propolis collector in position, the bees cannot leave the hive except through the drone escape. By partially withdrawing the scraper means to a second position, a second passageway is created behind the scraper means down and out through the base member. However, the ventilation characteristics of the propolis collector are not significantly changed and the bees continue to seal the small openings in the screen.

The scraper means when in position in the housing member is spaced from the adjacent portions of the front wall of the housing in order to permit the propolis collector to be placed thereon and the combination inserted. Blocking member 63 is preferably affixed to the front edge of the scraper means as shown in FIG. 5 although an unattached member can be utilized if desired.

If the scraper means is inserted as shown in FIG. 6 with the propolis collector placed thereon, a separate blocking member 50 can be utilized to limit entry of the bees. This mode of operation seals the hive unless the scraper is partially withdrawn to its second position. The ventilation through the propolis collector is via the front and rear passageways provided adjacent the pollen trap.

The particular operating combinations of pollen trap positions, scraper means orientation and the use of the blocking members for trapping and non-trapping in the different hive positions are more particularly described in my co-pending U.S. patent application Ser. No. 236,916, filed Feb. 23, 1981 in the name of Charles H. Robson and entitled Improved Pollen Trap and now U.S. Pat. No. 4,351,074. However, the propolis collector can be utilized in these different modes according to the particular desire of the operator.

While the foregoing has referred to a particular embodiment of the invention, it is recognized that many modifications and variations may be made therein without departing from the scope of the invention as set forth in the appended claims.

I claim:

1. In combination with apparatus for collecting hive products from a bee colony of the type having a bee passageway therein which communicates between a hive body and the external environment, said bee passageway containing scraper means for dislodging pollen from bees passing therethrough, the improvement which comprises:
   (a) scraper means which extend to an outer wall of the hive body to permit withdrawal therefrom;
   (b) a screen dimensioned to fit within said bee passageway and having a multiplicity of small openings therein, said openings providing ventilation through the passageway and preventing the passage of bees therethrough; and
   (c) means for removably placing said screen on said scraper means and permitting withdrawal to outside the hive body.

2. The improvement of claim 1 wherein said scraper means comprises a slidable member positioned within said hive body which extends outwardly to an outer wall thereof, said member having a central opening therein which communicates with the bee passageway, and said screen being dimensioned to removably overlay said opening.

3. The improvement of claim 2 wherein said slidable member extends to an outer wall of said hive body and is spaced from the adjacent underlying portion of said outer wall to permit bees to enter therebelow.

4. The improvement of claim 3 wherein said slidable member includes a scraper screen mounted in the central opening thereof, said scraper screen having openings therein of sufficient size to permit the passage of bees therethrough.

5. The improvement of claim 4 further comprising means for receiving a blocking member in the adjacent underlying portion of said outer wall for preventing the passage of bees therethrough.

6. The improvement of claim 5 wherein said slidable member is spaced from the adjacent overlying portion of said outer wall and further comprising means for receiving a blocking member in the adjacent overlying portion of said outer wall for preventing the passage of bees therethrough.

7. The improvement of claim 6 wherein said screen includes a frame extending about the peripheral portion thereof for maintaining said screen spaced from said scraper screen.

8. The improvement of claim 7 wherein said screen is formed of stainless steel.

* * * * *